(12) United States Patent
Sloo

(10) Patent No.: US 7,539,472 B2
(45) Date of Patent: May 26, 2009

(54) TYPE-AHEAD KEYPAD INPUT FOR AN INPUT DEVICE

(75) Inventor: David Hendler Sloo, Menlo Park, CA (US)

(73) Assignee: Microsoft Corporation, Redmond, WA (US)

( * ) Notice: Subject to any disclaimer, the term of this patent is extended or adjusted under 35 U.S.C. 154(b) by 366 days.

(21) Appl. No.: 11/225,146

(22) Filed: Sep. 13, 2005

(65) Prior Publication Data

US 2007/0060176 A1      Mar. 15, 2007

(51) Int. Cl.
  *H04B 1/18*    (2006.01)
(52) U.S. Cl. ............ 455/151.1; 455/3.03; 455/179.1; 455/566; 348/14.05; 348/114; 348/211.99; 348/734; 725/57; 725/61; 725/140; 725/153; 715/812; 715/816; 345/169
(58) Field of Classification Search ............... 455/3.03, 455/41.2, 41.3, 92, 151.1, 179.1, 352, 353, 455/418, 419, 466, 566; 348/14.05, 114, 348/211.99, 563, 564, 565, 569, 570, 734; 725/39, 40, 43, 44, 45, 52, 53, 56, 57, 61, 725/109; 707/3–6; 715/810, 812, 816; 345/169
See application file for complete search history.

(56) References Cited

U.S. PATENT DOCUMENTS

| | | | |
|---|---|---|---|
| 4,862,390 A | 8/1989 | Weiner | |
| 5,799,299 A | 8/1998 | Fujiwara | |
| 5,999,950 A | 12/1999 | Krueger et al. | |
| 6,216,264 B1 * | 4/2001 | Maze et al. | 725/53 |
| 6,646,572 B1 | 11/2003 | Brand | |
| 6,654,733 B1 | 11/2003 | Goodman et al. | |
| 6,661,482 B2 | 12/2003 | Hara | |
| 6,734,881 B1 | 5/2004 | Will | |
| 6,801,659 B1 | 10/2004 | O'Dell | |
| 7,098,896 B2 | 8/2006 | Kushler et al. | |
| 7,130,846 B2 | 10/2006 | Danker et al. | |
| 7,152,213 B2 | 12/2006 | Pu et al. | |
| 7,213,256 B1 * | 5/2007 | Kikinis | 725/53 |

(Continued)

FOREIGN PATENT DOCUMENTS

EP    1246430 A2    10/2002

(Continued)

OTHER PUBLICATIONS

PCT International Search Report and Written Opinion and dated Feb. 9, 2007, from counterpart PCT patent application serial No. PCT/US2006/035463, copy attached, 10 pages.

(Continued)

*Primary Examiner*—Alexander Eisen
*Assistant Examiner*—Wayne Cait
(74) *Attorney, Agent, or Firm*—Lee & Hayes, PLLC

(57) ABSTRACT

Type-ahead keypad input is described. In an embodiment, keypad inputs that are entered as characters of a search term on a keypad of an input device, such as a television remote control, are received by a television-based client device. A user interface displays the keypad inputs as they are received, and displays an alphanumeric keypad as a representation of the keypad of the input device. The keypad representation of the input device has input keys that include a display of characters, any of which can change after each keypad input is received.

20 Claims, 6 Drawing Sheets

U.S. PATENT DOCUMENTS

| | | | |
|---|---|---|---|
| 7,240,293 | B2 | 7/2007 | Lungwitz et al. |
| 7,318,019 | B1 | 1/2008 | Baker et al. |
| 2001/0044837 | A1 | 11/2001 | Talib et al. |
| 2002/0016804 | A1 | 2/2002 | Wasilewski |
| 2003/0014753 | A1* | 1/2003 | Beach et al. ............ 725/53 |
| 2004/0021691 | A1 | 2/2004 | Dostie et al. |
| 2004/0080487 | A1 | 4/2004 | Griffin et al. |
| 2005/0240964 | A1* | 10/2005 | Barrett .................. 725/44 |
| 2006/0167859 | A1* | 7/2006 | Verbeck Sibley et al. ...... 707/3 |
| 2007/0050337 | A1* | 3/2007 | Venkataraman et al. ........ 707/3 |
| 2007/0061321 | A1* | 3/2007 | Venkataraman et al. ........ 707/5 |
| 2007/0061754 | A1* | 3/2007 | Ardhanari et al. ........... 715/816 |

FOREIGN PATENT DOCUMENTS

| | | |
|---|---|---|
| WO | WO9414284 | 6/1994 |
| WO | WO2005064587 A2 | 7/2005 |

OTHER PUBLICATIONS

Supplementary European Search Report for Application No. 06803420.06 - 1527 / 1952222 PCT/US2006035463, mailed on Feb. 20, 2009, 10 pgs.

* cited by examiner

TYPE-AHEAD KEYPAD INPUT FOR AN INPUT DEVICE

BACKGROUND

For a television-based system, such as a digital television system or an IP-based television system, a television remote control may be the only input device by which a user can interact with the television system. Television remote controls can be difficult to use as text input devices, particularly due to the limited set of input keys that are available on such devices. For example, other than the various configuration and television-specific input keys, a television remote control may only have a standard numeric or alphanumeric input keypad that includes the numbers zero through nine to input a channel selection. A viewer cannot easily input letters for a text search in an electronic program guide to search for a specific program, music, television content, or various applications that may be available via the viewer's cable provider or other television system content provider.

A conventional alphanumeric input keypad on a television remote control or on other electronic devices, such as a cell phone for example, includes the numbers zero through nine along with the alphabetic characters "A" to "Z". Although zero (0) through nine (9) is a total of ten input keys, an alphanumeric or numeric input keypad is commonly referred to as a "9-key" keypad. The letters on a "9-key" keypad are distributed along with the input keys two (2) through nine (9). For example, the input key two (2) includes the letters "A", "B", and "C", the input key three (3) includes the letters "D", "E", and "F", and so on with each consecutive input key being associated with the next consecutive three letters. The letters "Q" and "Z" may not be included on some keypads, but if they are, the input key seven (7) has four associated letters to include "Q" and the input key nine (9) has four associated letters to include "Z".

Techniques are available to enter text with an alphanumeric "9-key" keypad, however they are difficult to enter text and in some cases, can require more user inputs than would actually be required to input a text string for the word itself, such as with a computer keyboard. The techniques to enter text and/or letters with a "9-key" keypad include multi-tapping (also referred to as "triple-tap") and triple-tap-extended which are commonly used with cell phones to create text messages. As described above, the letters "A", "B", and "C" are associated with the number two (2) input key on the keypad for triple-tap text entry. Pressing the input key once enters an "A", twice enters a "B", three times enters a "C", and four times enters a "2". For triple-tap-extended, multiple characters are mapped to the number two (2) input key on a keypad, such as "A", "B", "C", "a", "b", "c", "2", and the "@" symbol. Multiple characters are similarly mapped to the additional numeric input keys zero (0) through nine (9) on an alphanumeric "9-key" keypad for triple-tap-extended text entry.

Spelling out even a short word can require multiple key entries with an alphanumeric "9-key" keypad. For example, to spell out "CAB" with triple-tap, a user would have to press the number two (2) input key a total of six times—three more inputs than would be necessary with a conventional keyboard. An alternative text-entry technique is "T9" ("text on nine keys") of which several variations are available, such as a technique to use additional, non-numeric keys to select whole-word choices from a list. Typically, however, "T9" selects a letter that is associated with a key input to spell a word correctly based on a likelihood of letter combinations. With "T9", a user may only have to press an input key once rather than multiple times as with multi-tapping. For example, to again spell out "CAB", a user would only have to press the number two (2) input key a total of three times (once for "C", twice for "CC", and a third time for "CAB"). The "T9" technique is not without its limitations however. Depending on the presumed likely letter combinations, a user may have to switch back to multi-tapping to create a word that "T9" does not recognize, or the user may have to input several "T9" key combinations to create the word.

Irrespective of the technique implemented to enter text with an alphanumeric "9-key" keypad, the conventional text input techniques are cumbersome, often require more key inputs than would otherwise be necessary, and/or require unnatural combinations of key inputs.

SUMMARY

This summary is provided to introduce simplified concepts of type-ahead keypad input which is further described below in the Detailed Description. This summary is not intended to identify essential features of the claimed subject matter, nor is it intended for use in determining the scope of the claimed subject matter.

In an embodiment of type-ahead keypad input, keypad inputs that are entered as characters of a search term on a keypad of an input device, such as a television remote control, are received by a television-based client device. A user interface displays the keypad inputs as they are received, and displays an alphanumeric keypad as a representation of the keypad of the input device. The keypad representation of the input device has input keys that include a display of characters, any one or more of which can change after each keypad input is received. For example, the display on an input key can change to display subsequent possible character selections based on the received keypad inputs, and/or the display on an input key can change to display a searchable entry from a database that correlates to the received keypad inputs.

In another embodiment of type-ahead keypad input, the television-based client device receives triple-tap inputs entered on the keypad of the input device, and the user interface displays searchable entries from the database that correlate to the received keypad inputs. The user interface can also display an input key number to associate a searchable entry from the database with a numeric input key on the alphanumeric keypad representation. The television-based client device can then receive a numeric keypad input entered on the keypad of the input device to select the searchable entry associated with the displayed input key number.

BRIEF DESCRIPTION OF THE DRAWINGS

The same numbers are used throughout the drawings to reference like features and components.

DETAILED DESCRIPTION

Type-ahead keypad input is described in which embodiments provide that a user can enter search term(s) in a television-based system utilizing an alphanumeric keypad of a television remote control, cell phone, or other similar input device having a conventional "9-key" numeric or alphanumeric input keypad. A user can input the characters (e.g., letters, numbers, symbols, and/or any combination thereof) of a search term and a user interface displays the keypad inputs as they are received. The user interface also displays searchable entries from a database that correlate to the received keypad inputs.

Additionally, an alphanumeric keypad is displayed on the user interface as a representation of the keypad of the input device (e.g., a television remote control). The keypad representation of the input device has input keys that include a display of characters. For example, the numeric input key (2) includes the letters "A", "B", and "C", the numeric input key (3) includes the letters "D", "E", and "F", and so on. Any one or more of the input keys display of characters can change after each keypad input is received. For example, the display on an input key can change to display only subsequent possible character selections based on the received keypad inputs. Additionally, the display on an input key can change to display a searchable entry, or portion thereof, that correlates to the received keypad inputs.

The user interface can also be updated to display an input key number to associate a searchable entry from the database with a numeric input key on the alphanumeric keypad representation. The television-based client device can then receive a keypad input entered on the keypad of the input device to select the searchable entry associated with the input key number displayed proximate the searchable entry on the user interface.

Type-ahead keypad input limits the selection options of the searchable entries in the database with each additional character that is received, and one input can translate to multiple searchable entries in the database. This provides that a user can search for various applications, movies, television programs, music, and other audio, video, and/or image content that may be recorded or available via a content provider, and use less keypad inputs than triple-tap or triple-tap-extended to search faster and more efficiently. This also provides an easier selection technique once a media item has been located.

While aspects of the described systems and methods for type-ahead keypad input can be implemented in any number of different computing systems, environments, television-based entertainment systems, and/or configurations, embodiments of type-ahead keypad input are described in the context of the following exemplary system architectures.

Figure 1:
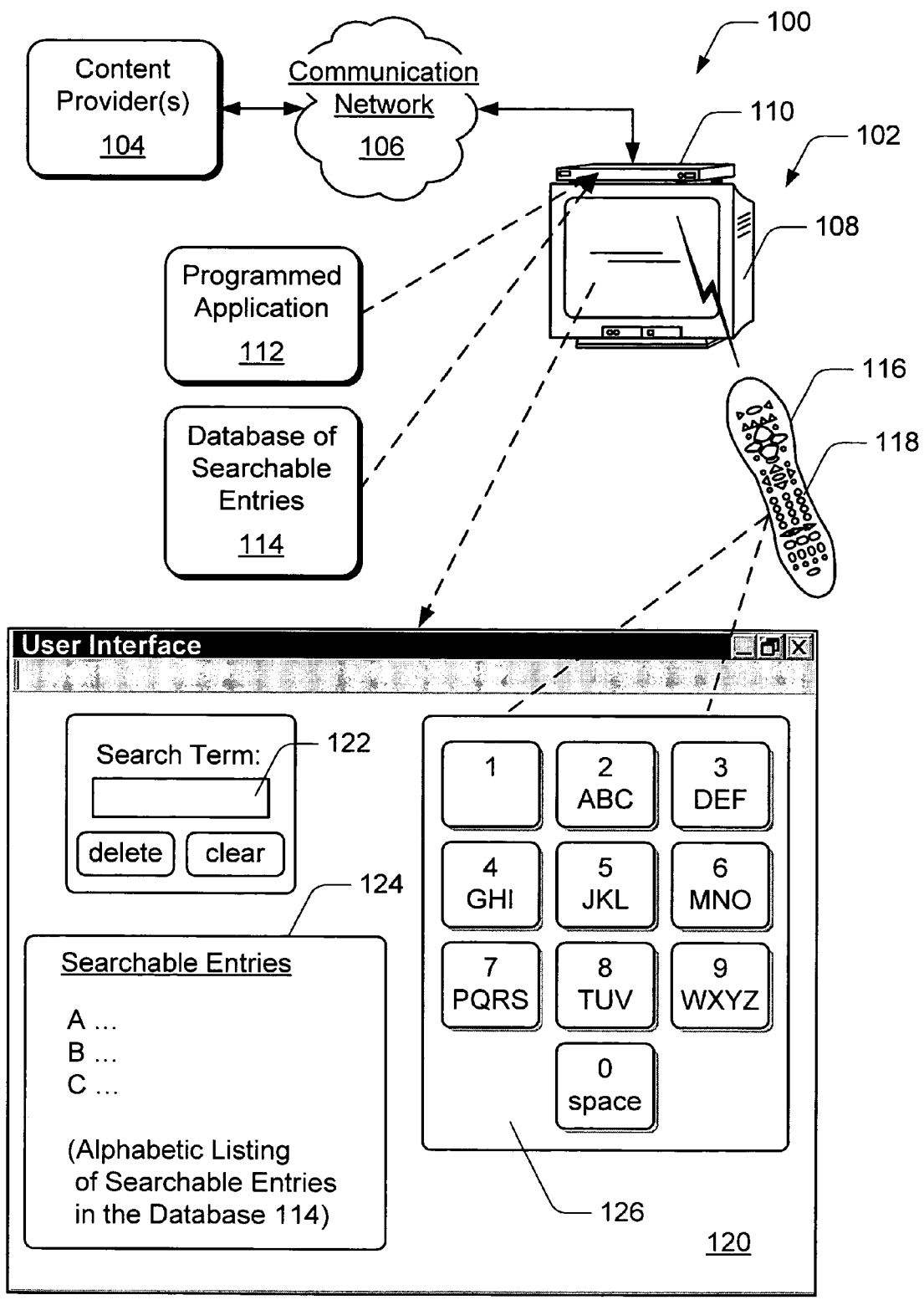
FIG. 1 illustrates an exemplary search term entry system in which embodiments of type-ahead keypad input can be implemented.

FIG. 1 illustrates an exemplary search term input system 100 in which embodiments of type-ahead keypad input can be implemented. In this example, the system 100 includes an exemplary television-based client system 102 configured for data communication with any number of content provider(s) 104 via a communication network 106, which in this example, is an IP-based network. The embodiments of type-ahead keypad input described herein can also be implemented in any digital television-based system. The client system 102 receives program content, various forms of media content, television programs, movies, program guide data, advertising content, and the like from content server(s) of the content provider(s) 104 via the IP-based network 106.

The television-based client system 102 includes a display device 108 (e.g., a television, LCD display, or the like) and a client device 110. The client device 110 can be implemented in any number of embodiments, such as a set-top box, a digital video recorder (DVR) and playback system, a personal video recorder (PVR), an appliance device, a gaming system, any combination thereof, and as any other type of client device that may be implemented in a television-based entertainment and information system. In an embodiment, the client device 110 can be implemented with any one or combination of the components described with reference to client device 500 shown in FIG. 5. Further, any combination of the components described with reference to the search term input system 100 can be implemented in the exemplary television-based system 600 that includes examples of both a network-based content provider and television-based client devices as described with reference to FIG. 6.

In this example, the client device 110 includes a programmed application 112 that can be programmed to implement the features and embodiments of type-ahead keypad input as described herein. Although the programmed application 112 is illustrated and described as a single application configured to implement embodiments of type-ahead keypad input, the programmed application 112 can be implemented as several component applications distributed to each perform one or more functions in client device 110.

The client device 110 also includes a database of searchable entries 114 that correspond to various applications, movies, television programs, music, and other audio, video, and/or image content that may be recorded or available via a content provider 104, and that a user at the television-based client system 102 may want to access. In one embodiment, the database of searchable entries 114 may be information that is included in the program guide data received from the content provider(s) 104, and in an alternate embodiment, the information may be independent from the program guide data. The database of searchable entries 114 may also include any accessible information that may be available via an IPTV system, such as the television-based system 600 described with reference to FIG. 6.

A user can input a sequence of characters to enter a search term to search the database of searchable entries 114 with an input device, such as television remote control 116 that has a "9-Key" alphanumeric keypad 118. A search term can be entered on the alphanumeric keypad 118 as a sequence of characters that are each entered as one or more keypad inputs, such as triple-tap inputs or triple-tap-extended inputs. A search term can be entered as any form of text, letters, punctuation, a word, and/or any combination of alphabetic character(s) and numeric character(s). A user may also enter a search term via the client device 110 with a cellular phone, PDA, or similar input device having a keypad which may be configured to operate as a television remote control device.

A user interface 120 is displayed on the display device 108 to facilitate a user searching the database of searchable entries 114. In this example, the user interface 120 includes a search term edit box 122 and a searchable entries listing 124. The search term edit box 122 displays the sequence of characters input by a user when entering a search term with an input device, such as the television remote control 116. In this example, the searchable entries listing 124 displays an alphabetic listing of the searchable entries from the database of searchable entries 114. As shown in the following FIGS. 2-3, the searchable entries listing 124 changes to display searchable entries that correlate to keypad inputs as they are received and displayed in the search term edit box 122. The searchable entries display 124 provides a scaled down version of the many possible searchable entries in the database of searchable entries 114 with each additional character entry. This presents the user with less selection options to make navigating the entire list of searchable entries easier and quicker.

The user interface 120 also includes an alphanumeric keypad representation 126 that represents the keypad 118 of the television remote control 116. The keypad representation 126 includes input keys zero (0) through nine (9) along with the alphabetic characters "A" to "Z". The letters on the keypad representation 126 are distributed along with the input keys two (2) through nine (9). For example, the input key two (2) includes the letters "A", "B", and "C", the input key three (3) includes the letters "D", "E", and "F", and so on with each consecutive numbered input key being associated with the next consecutive three letters. The letters "Q" and "Z" are included such that the input key seven (7) has four associated letters to include "Q" and the input key nine (9) has four associated letters to include "Z".

For triple-tap-extended, multiple characters may be mapped to each of the input keys. For example, "A", "B", "C", "a", "b", "c", "2", and the "@" symbol may be mapped to the number two (2) input key on the keypad representation 126. Multiple characters may be similarly mapped to the additional numeric input keys zero (0) through nine (9) on an alphanumeric "9-key" keypad for triple-tap-extended text entry. Although the examples in FIGS. 1-3 illustrate that a keypad representation of an input device has input keys that include a display of alphabetic characters, the input keys can include any form of characters such as text, letters, punctuation, a word, and/or any combination of alphabetic character(s) and numeric character(s).

Figure 2:
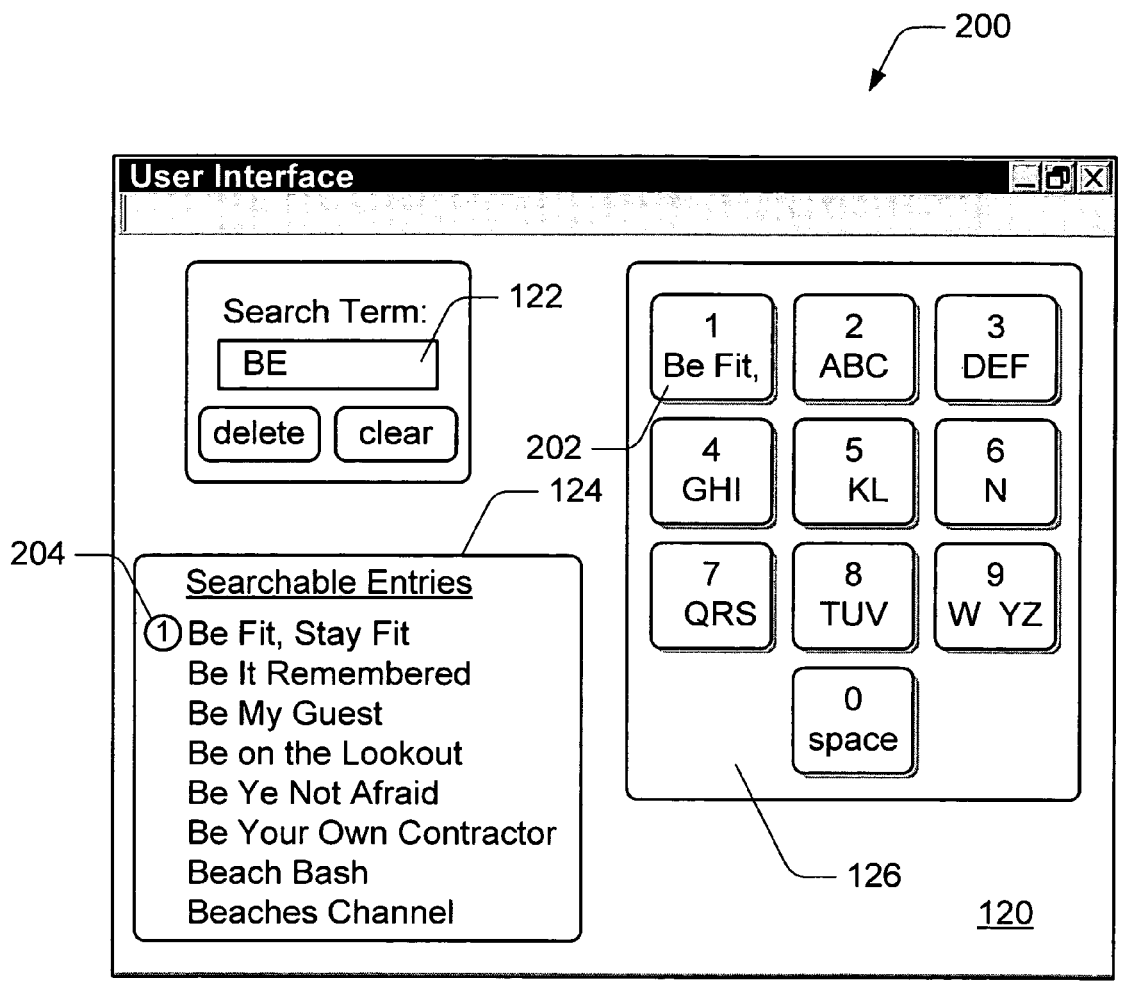
FIG. 2 illustrates an example entry of a search term entered with an alphanumeric keypad in an embodiment of type-ahead keypad input.
Figure 3:
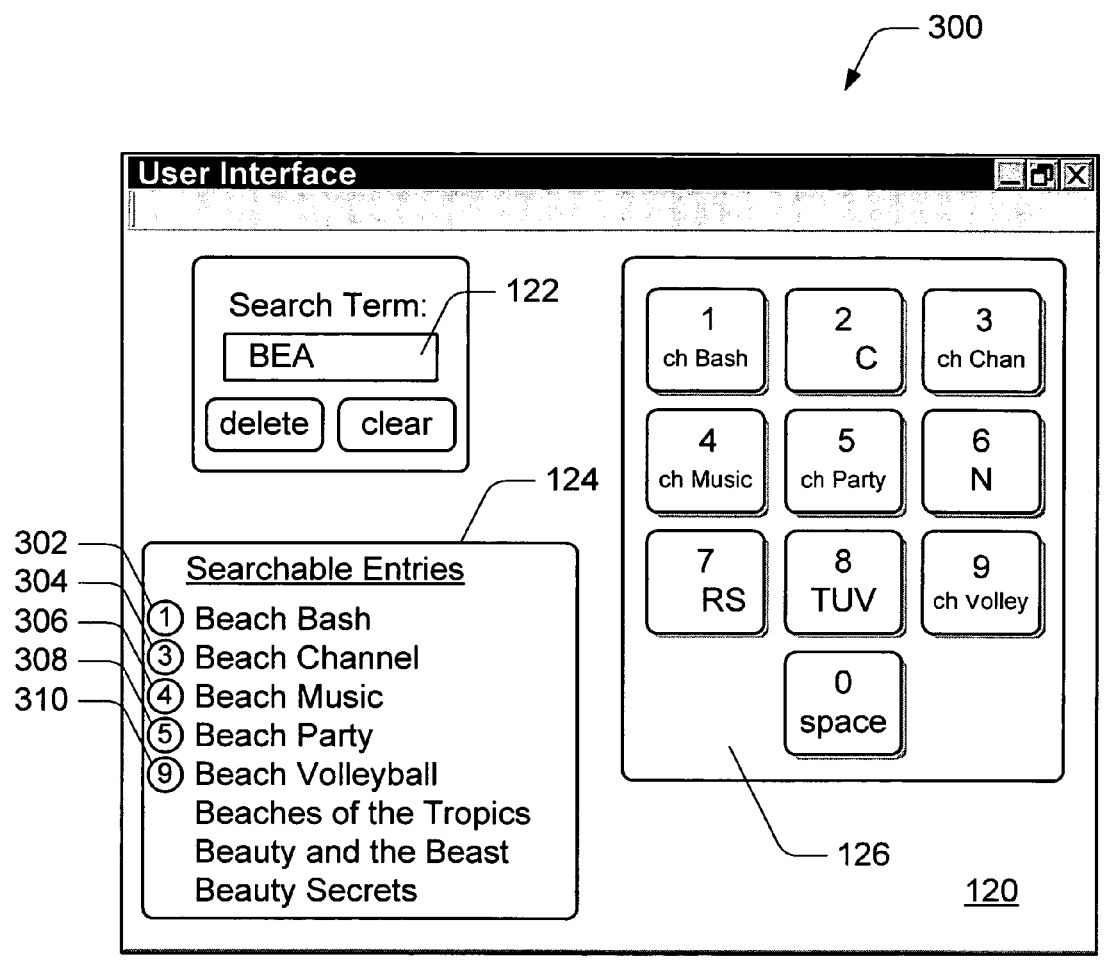
FIG. 3 further illustrates the example entry of the search term entered with an alphanumeric keypad in an embodiment of type-ahead keypad input.

FIG. 2 illustrates an example entry 200 of characters of a search term entered with triple-tap keypad inputs (to include triple-tap-extended keypad inputs as described herein), and illustrates the display on user interface 120. In this example, a user at the television-based client system 102 (FIG. 1) enters the characters "B" and "E" as the first characters in a sequence of characters that represent a search term. The characters of the search term are displayed on the user interface 120 in the search term edit box 122.

To enter the first "B" character, a user enters numeric input key (2) on the alphanumeric keypad 118 of the remote control device 116. For triple-tap text entry, the user first enters numeric input key (2) and an "A" is displayed in the search term edit box 122. When the numeric input key (2) is entered a second time, a "B" replaces the "A" and is displayed in the search term edit box 122. After a pause and to enter the second "E" character, the user enters numeric input key (3) on the alphanumeric keypad 118 of the remote control device 116. The user first enters numeric input key (3) and a "D" is displayed in the search term edit box 122. When the numeric input key (3) is entered a second time, an "E" replaces the "D" and is displayed in the search term edit box 122 after the "B".

As the characters of a search term are entered ("B" and "E" in this example), the programmed application 112 (FIG. 1) correlates the keypad inputs to searchable entries (or entry) in the database of searchable entries 114. The programmed application 112 then initiates updates to the user interface 120 to reflect the keypad inputs as each character of the search term is received. In this example, the searchable entries listing 124 is updated to display searchable entries that begin with the first characters "BE" (or "Be" and "be") of the search term displayed in the search term edit box 122. For example, there are several searchable entries that begin with the word "Be" and "Beach" in the searchable entries listing 124.

Additionally, the numeric input key(s) of the keypad representation 126 on the user interface 120 are updated. The alphabetic characters on any one or more of the input keys are updated to reflect the subsequent possible character selections based on the received keypad inputs. For example, the database of searchable entries 114 in this example does not include an entry that begins with the letters "BEJ". Accordingly, the "J" is no longer displayed on the numeric input key (5) on the keypad representation 126. Similarly, the database of searchable entries 114 does not include an entry that begins with the letters "BEM", "BEO", "BEP", or "BEX". Accordingly, the "M" and "O" are no longer displayed on the numeric input key (6), the "P" is no longer displayed on the numeric input key (7), and the "X" is no longer displayed on the numeric input key (9) on the keypad representation 126.

In this example, the numeric input key (1) is also updated at 202 to display a searchable entry, or a portion thereof, from the database of searchable entries 114 that correlates to the received keypad inputs. The numeric input key (1) displays a portion of the title of the first searchable entry "Be Fit, Stay Fit" from the searchable entries listing 124. Additionally, the programmed application 112 initiates a display 204 of an input key number to associate the first searchable entry in the searchable entries listing 124 to the numeric input key (1). A user can then enter the numeric input key (1) on the keypad 118 of the remote control device 116 (FIG. 1) to select the first searchable entry in the searchable entries listing 124 and begin watching the television program (or movie, or initiate access to an application, or the like depending upon what type of media content corresponds to the searchable entry).

FIG. 3 further illustrates an example entry 300 of characters of the search term entered with triple-tap keypad inputs. Continuing from the example entry 200 (FIG. 2), the user enters numeric input key (2) on the alphanumeric keypad 118 of the remote control device 116 (FIG. 1) to enter the third character "A" in the sequence of characters "BEA" for the search term that is displayed in the search term edit box 122 on user interface 120. The programmed application 112 (FIG. 1) correlates the combination of characters "BEA" to searchable entries (or entry) in the database of searchable entries 114. The programmed application 112 then initiates updates to the user interface 120 to reflect the additional keypad input as the character is received.

In this example, the searchable entries listing 124 is updated to display searchable entries that begin with the first characters "BEA" (or "Bea", "bea", and the like) of the search term displayed in the search term edit box 122. For example, there are several searchable entries that begin with the word "beach", "beaches", and "beauty". Additionally, the numeric input key(s) of the keypad representation 126 on the user interface 120 are updated. The alphabetic characters on any one or more of the input keys are updated to reflect the subsequent possible character selections based on the received keypad inputs. For example, the database of searchable entries 114 in this example does not include an entry that begins with the letters "BEAA" or "BEAB". Accordingly, the "A" and the "B" are no longer displayed on numeric input key (2) on the keypad representation 126. Similarly, the numeric input keys (3) through (5) and (9) no longer display the alphabetic characters that are not a possible match with a searchable entry in the database of searchable entries 114.

In this example, the numeric input keys (1), (3) through (5), and (9) are also updated to display a searchable entry from the database of searchable entries 114 that correlates to the received keypad inputs "BEA" as displayed in the search term edit box 122. The numeric input keys (1), (3) through (5), and (9) can display a searchable entry from the database of searchable entries 114 because all of the alphabetic characters that were originally displayed on each of the respective numeric input keys are not a subsequent possible match with a searchable entry in the database of searchable entries 114. The numeric input key (1) displays a portion of the title of the first searchable entry "Beach Bash" in the searchable entries listing 124. Similarly, the numeric input key (3) displays a portion of the title of the second searchable entry "Beach Channel"; the numeric input key (4) displays a portion of the title of the third searchable entry "Beach Music"; the numeric input key (5) displays a portion of the title of the fourth searchable entry "Beach Party"; and the numeric input key (9) displays a portion of the title of the fifth searchable entry "Beach Volleyball".

Additionally, the programmed application 112 initiates a display 302 of an input key number "1" to associate the first searchable entry in the searchable entries listing 124 to the numeric input key (1). Similarly, a display 304 of an input key number "3" associates the second searchable entry in the searchable entries listing 124 to the numeric input key (3); a display 306 of an input key number "4" associates the third searchable entry in the searchable entries listing 124 to the numeric input key (4); a display 308 of key number "5" associates the fourth searchable entry in the searchable entries listing 124 to the numeric input key (5); and a display 310 of an input key number "9" associates the fifth searchable entry in the searchable entries listing 124 to the numeric input key (9). A user can then enter any of the designated numeric input keys on the keypad 118 of the remote control device 116 (FIG. 1) to select the corresponding searchable entry in the searchable entries listing 124 and begin watching the television program (or movie, or initiate access to an application, or the like depending upon what type of media content corresponds to the selected data entry).

Methods for type-ahead keypad input, such as exemplary method 400 described with reference to FIG. 4, may be described in the general context of computer executable instructions. Generally, computer executable instructions can include routines, programs, objects, components, data structures, procedures, modules, functions, and the like that perform particular functions or implement particular abstract data types. The methods may also be practiced in a distributed computing environment where functions are performed by remote processing devices that are linked through a communications network. In a distributed computing environment, computer executable instructions may be located in both local and remote computer storage media, including memory storage devices.

Figure 4:
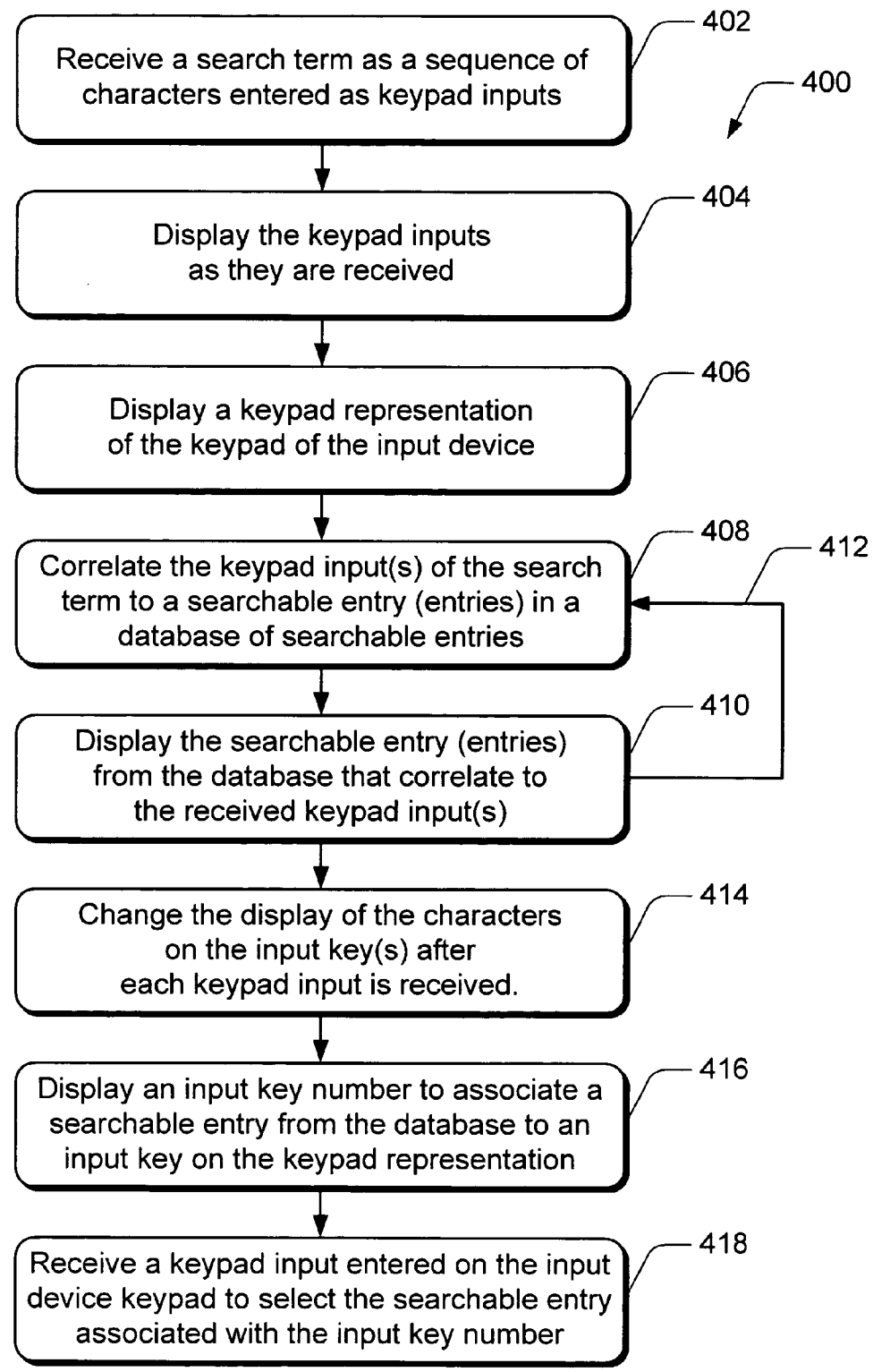
FIG. 4 illustrates an exemplary method for type-ahead keypad input.

FIG. 4 illustrates an exemplary method 400 for type-ahead keypad input, and is described with reference to the exemplary search term input system 100 shown in FIG. 1, and with reference to the example search term entries 200 and 300 shown in respective FIGS. 2 and 3. The order in which the method is described is not intended to be construed as a limitation, and any number of the described method blocks can be combined in any order to implement the method, or an alternate method. Furthermore, the method can be implemented in any suitable hardware, software, firmware, or combination thereof.

At block 402, a search term is received as a sequence of characters that are each entered as a keypad input. For example, a search term to search the database of searchable entries 114 can be received as a sequence of characters entered on an alphanumeric "9-key" keypad 118 with tripletap or triple-tap-extended text entries. The keypad 118 can be a keypad of a television remote control device 116, a cell phone, a PDA, or other similar electronic device that may be implemented as a television-based input device. At block 404, the keypad inputs are displayed as they are received. For example, the sequence of keypad inputs are displayed in a search term edit box 122 on user interface 120 as the keypad inputs are received at the television-based client device 110.

At block 406, a keypad representation of the keypad of the input device is displayed. For example, an alphanumeric keypad 126 is displayed on the user interface 120 as a representation of the keypad 118 of the input device 116 (e.g., the television remote control) that can be utilized to input the characters of the search term. The keypad representation 126 has input keys that, in this example, each include a display of characters and/or punctuation symbols.

At block 408, the keypad input(s) of the search term are correlated to one or more searchable entries in a database. For example, the programmed application 112 correlates the keypad inputs shown in the search term edit box 122 to locate searchable entries in the database of searchable entries 114. At block 410, the searchable entries from the database that correlate to the received keypad inputs are displayed. For example, the searchable entries listing 124 on the user interface 120 displays an alphabetic listing of the searchable entries from the database of searchable entries 114 as they are correlated to the received sequence of keypad inputs.

At 412, the method continues from block 410 to block 408 until all of the search term matches in the database have been identified (some of which are displayed on the user interface 120 in the searchable entries listing 124). At block 414, the display of the characters on the input key(s) is changed after each keypad input is received. For example, the characters on any one or more of the input keys of the keypad representation 126 are updated to reflect the subsequent possible character selections based on the received keypad inputs. Additionally, any one or more of the input keys of the keypad representation 126 can be updated to display a searchable entry from the database of searchable entries 114 that correlates to the combination of received keypad inputs. For example, the numeric input key (1) on the keypad representation 126 (FIG. 2) displays a portion of the title of the first searchable entry "Be Fit, Stay Fit" from the searchable entries listing 124.

At block 416, an input key number is displayed to associate a searchable entry from the database to an input key on the keypad representation. For example, the programmed application 112 initiates a display 204 (FIG. 2) of an input key number to associate the first searchable entry in the searchable entries listing 124 to the numeric input key (1) on the keypad representation 126. At block 418, a keypad input entered on the keypad of the input device is received to select a searchable entry associated with an input key number. For example, a user can enter the numeric input key (1) on the keypad 118 of the input device 116 (FIG. 1) to select the first searchable entry in the searchable entries listing 124 and begin watching the television program (or movie, or initiate access to an application, or the like depending upon what type of media content corresponds to the selected searchable entry).

Figure 5:
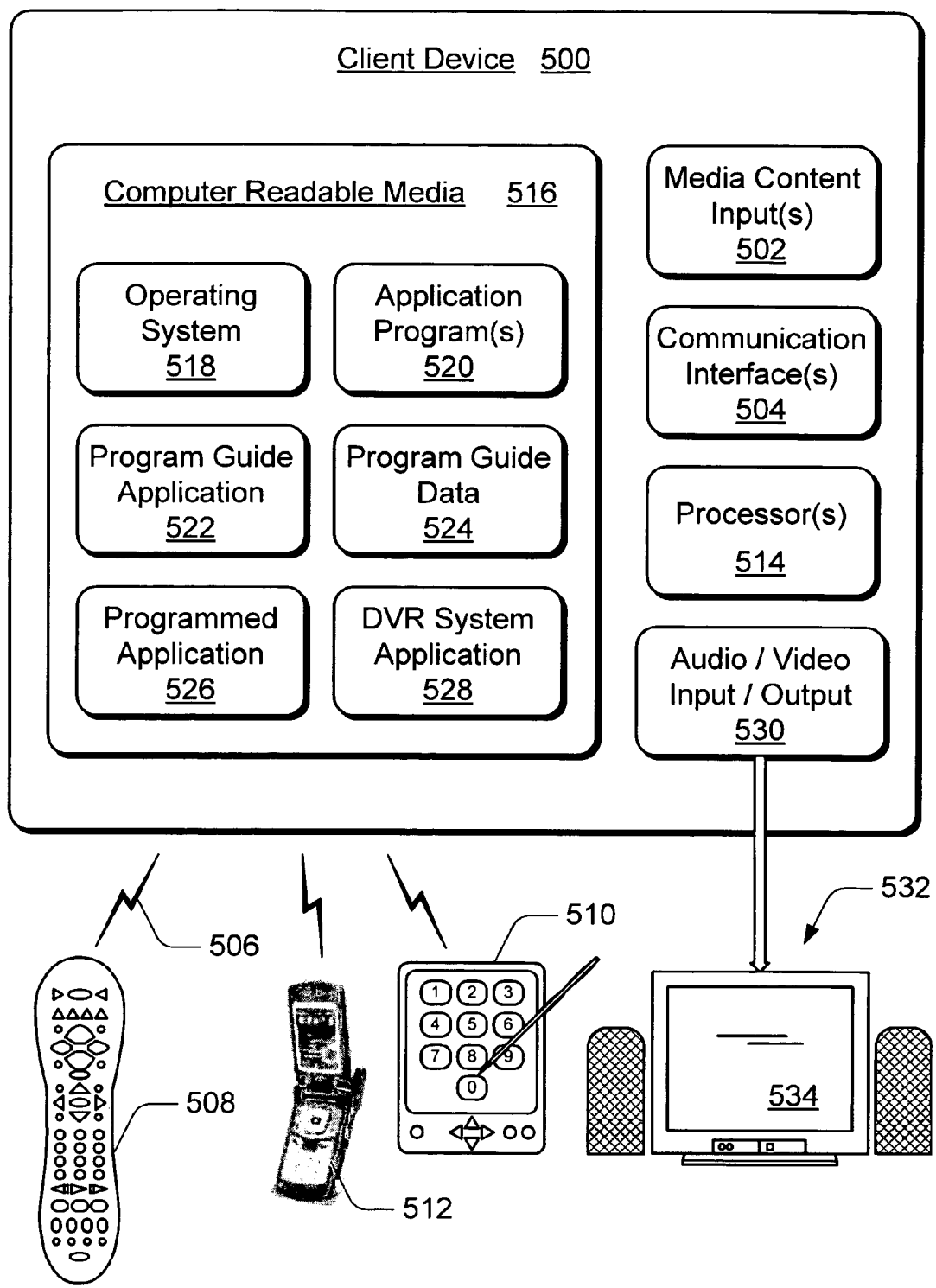
FIG. 5 illustrates various components of an exemplary client device in which embodiments of type-ahead keypad input can be implemented.

FIG. 5 illustrates various components of an exemplary client device 500 which can be implemented as any form of a computing, electronic, and/or television-based client device, and in which embodiments of type-ahead keypad input can be implemented. For example, the client device 500 can be implemented as the television-based client device 110 described with reference to FIGS. 1-3 and shown in FIG. 1 as part of the television-based client system 102.

Client device 500 includes one or more media content inputs 502 which may include Internet Protocol (IP) inputs over which streams of media content are received via an IP-based network. Device 500 further includes communication interface(s) 504 which can be implemented as any one or more of a serial and/or parallel interface, a wireless interface, any type of network interface, a modem, and as any other type of communication interface. A wireless interface enables client device 500 to receive control input commands 506 and other information from an input device, such as from remote control device 508, PDA (personal digital assistant) 510, cellular phone 512, or from another infrared (IR), 802.11, Bluetooth, or similar RF input device.

A network interface provides a connection between the client device 500 and a communication network by which other electronic and computing devices can communicate data with device 500. Similarly, a serial and/or parallel interface provides for data communication directly between client device 500 and the other electronic or computing devices. A modem facilitates client device 500 communication with other electronic and computing devices via a conventional telephone line, a DSL connection, cable, and/or other type of connection.

Client device 500 also includes one or more processors 514 (e.g., any of microprocessors, controllers, and the like) which process various computer executable instructions to control the operation of device 500, to communicate with other electronic and computing devices, and to implement embodiments of type-ahead keypad input. Client device 500 can be implemented with computer readable media 516, such as one or more memory components, examples of which include random access memory (RAM), non-volatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), a DVD, a DVD+RW, and the like.

Computer readable media 516 provides data storage mechanisms to store various information and/or data such as software applications and any other types of information and data related to operational aspects of client device 500. For example, an operating system 518 and/or other application programs 520 can be maintained as software applications with the computer readable media 516 and executed on processor(s) 514 to implement embodiments of type-ahead keypad input.

For example, client device 500 can be implemented to include a program guide application 522 that is implemented to process program guide data 524 and generate program guides for display which enable a viewer to navigate through an onscreen display and locate broadcast programs, recorded programs, video on-demand programs and movies, interactive game selections, network-based applications, and other media access information or content of interest to the viewer. The computer readable media 516 can also include a programmed application 526 to implement features and embodiments of type-ahead keypad input as described herein. The computer readable media 516 can also include a DVR system application 528 to maintain and playback recorded media content.

Although the programmed application 526 is illustrated and described as a single application configured to implement embodiments of type-ahead keypad input, the programmed application 526 can be implemented as several component applications distributed to each perform one or more functions in a client device in a television-based entertainment and information system. Further, the program guide application 522 may include the programmed application 526 as an integrated module or component to implement embodiments of type-ahead keypad input.

The client device 500 also includes an audio and/or video output 530 that provides audio and video to an audio rendering and/or display system 532, or to other devices that process, display, and/or otherwise render audio, video, and display data. Video signals and audio signals can be communicated from device 500 to a television 534 (or to other types of display devices) via an RF (radio frequency) link, S-video link, composite video link, component video link, analog audio connection, or other similar communication link.

Figure 6:
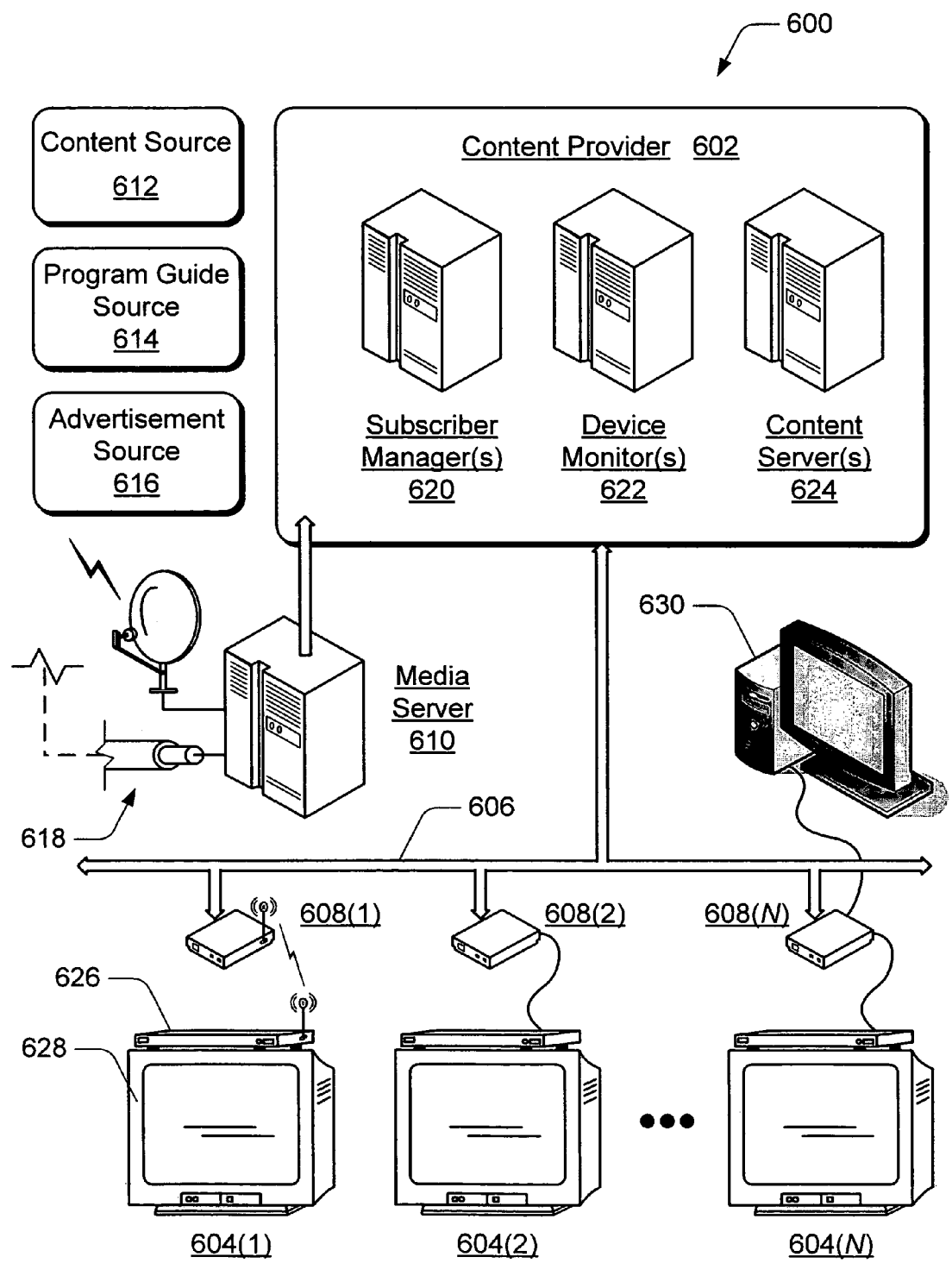
FIG. 6 illustrates various devices and components in an exemplary entertainment and information system in which embodiments of type-ahead keypad input can be implemented.

FIG. 6 illustrates an exemplary entertainment and information system 600 in which an IP-based television environment can be implemented, and in which embodiments of type-ahead keypad input can be implemented. System 600 facilitates the distribution of program content, program guide data, and advertising content to multiple viewers. System 600 includes a content provider 602 and television-based client systems 604(1-N) each configured for communication via an IP-based network 606.

The network 606 can be implemented as a wide area network (e.g., the Internet), an intranet, a Digital Subscriber Line (DSL) network infrastructure, or as a point-to-point coupling infrastructure. Additionally, network 606 can be implemented using any type of network topology and any network communication protocol, and can be represented or otherwise implemented as a combination of two or more networks. A digital network can include various hardwired and/or wireless links 608(1-N), routers, gateways, and so on to facilitate communication between content provider 602 and the client systems 604(1-N). The television-based client systems 604(1-N) receive program content, program guide data, advertising content, closed captions data, and the like from content server(s) of the content provider 602 via the IP-based network 606.

System 600 includes a media server 610 that receives program content from a content source 612, program guide data from a program guide source 614, and advertising content from an advertisement source 616. In an embodiment, the media server 610 represents an acquisition server that receives the audio and video program content from content source 612, an EPG server that receives the program guide data from program guide source 614, and/or an advertising management server that receives the advertising content from the advertisement source 616.

The content source 612, the program guide source 614, and the advertisement source 616 control distribution of the program content, the program guide data, and the advertising content to the media server 610 and/or to other television-based servers. The program content, program guide data, and advertising content is distributed via various transmission media 618, such as satellite transmission, radio frequency transmission, cable transmission, and/or via any number of other wired or wireless transmission media. In this example, media server 610 is shown as an independent component of system 600 that communicates the program content, program guide data, and advertising content to content provider 602. In an alternate implementation, media server 610 can be implemented as a component of content provider 602.

Content provider 602 is representative of a headend service in a television-based content distribution system, for example, that provides the program content, program guide data, and advertising content to multiple subscribers (e.g., the television-based client systems 604(1-N)). The content provider 602 can be implemented as a satellite operator, a network television operator, a cable operator, and the like to control distribution of program and advertising content, such as movies, television programs, commercials, music, and other audio, video, and/or image content to the client systems 604(1-N).

Content provider 602 includes various components to facilitate media data processing and content distribution, such as a subscriber manager 620, a device monitor 622, and a content server 624. The subscriber manager 620 manages subscriber data, and the device monitor 622 monitors the client systems 604(1-N) (e.g., and the subscribers), and maintains monitored client state information.

Although the various managers, servers, and monitors of content provider 602 (to include the media server 610 in one embodiment) are illustrated and described as distributed, independent components of content provider 602, any one or more of the managers, servers, and monitors can be implemented together as a multi-functional component of content provider 602. Additionally, any one or more of the managers, servers, and monitors described with reference to system 600 can implement features and embodiments of type-ahead keypad input.

The television-based client systems 604(1-N) can be implemented to include a client device 626 and a display device 628 (e.g., a television). A client device 626 of a television-based client system 604 can be implemented in any number of embodiments, such as a set-top box, a digital video recorder (DVR) and playback system, a personal video recorder (PVR), an appliance device, a gaming system, and as any other type of client device that may be implemented in a television-based entertainment and information system. In an alternate embodiment, client system 604(N) is implemented with a computing device 630 as well as a client device 626. Additionally, any of the client devices 626 of a client system 604 can implement features and embodiments of type-ahead keypad input as described herein.

Although embodiments of type-ahead keypad input have been described in language specific to structural features and/or methods, it is to be understood that the subject of the appended claims is not necessarily limited to the specific features or methods described. Rather, the specific features and methods are disclosed as exemplary implementations of type-ahead keypad input.

The invention claimed is:

1. A method, comprising:
   receiving keypad inputs of a search term on a keypad of an input device;
   displaying a keypad representation of the keypad of the input device, the keypad representation having input keys, at least one input key including a display of characters;
   correlating a keypad input of the search term to one or more searchable entries in a database; and
   changing the display of the characters on the at least one input key after each keypad input is received, wherein changing the display includes changing the characters on the at least one input key to display subsequent possible character selections on the received keypad inputs.

2. A method as recited in claim 1, further comprising displaying the keypad inputs as they are received.

3. A method as recited in claim 1, further comprising displaying the one or more searchable entries from the database that correlate to the received keypad inputs.

4. A method as recited in claim 1, wherein changing the display includes changing the characters on the at least one input key to display a searchable entry from the database that correlates to the received keypad inputs.

5. A method as recited in claim 1, further comprising changing the display of the characters on the input keys of the keypad representation, wherein the display on the at least one input key is changed to display subsequent possible character selections based on the received keypad inputs, and wherein the display on at least a second input key is changed to display a portion of a searchable entry from the database that correlates to the received keypad inputs.

6. A method as recited in claim 1, further comprising:
   displaying the one or more searchable entries from the database that correlate to the received keypad inputs; and
   displaying an input key number to associate a searchable entry from the database to an input key on the keypad representation.

7. A method as recited in claim 1, further comprising:
   displaying the one or more searchable entries from the database that correlate to the received keypad inputs;
   displaying an input key number to associate a searchable entry from the database with an input key on the keypad representation; and
   receiving a keypad input entered on the keypad of the input device to select the searchable entry associated with the input key number.

8. A search system, comprising:
   a television-based device configured to receive keypad inputs of a search term entered on a keypad of a television remote control device;
   a user interface configured to display the keypad inputs as they are received, and further configured to display an alphanumeric keypad that represents the keypad of the television remote control device, the alphanumeric keypad having input keys, at least one input key including a display of characters; and
   a programmed application configured to correlate a keypad input of the search term to one or more searchable entries in a database, the programmed application further configured to change the display of the characters on the at least one input key after each keypad input is received, wherein the programmed application is further configured to initiate a change of the display of the characters on the at least one input key to display subsequent possible character selections based on the received keypad inputs.

9. A search system as recited in claim 8, wherein the user interface is further configured to display one or more searchable entries from the database that correlate to the received keypad inputs.

10. A search system as recited in claim 8, wherein the programmed application is further configured to initiate a change of the display of the characters on the at least one input key to display a searchable entry from the database that correlates to the received keypad inputs.

11. A search system as recited in claim 8, wherein the programmed application is further configured to initiate a change of the display of the characters on the input keys of the alphanumeric keypad that represents the keypad of the television remote control device, the display on the at least one input key changed to display subsequent possible character selections based on the received keypad inputs, and the display on at least a second input key changed to display a portion of a searchable entry from the database that correlates to the received keypad inputs.

12. A search system as recited in claim 8, wherein the user interface is further configured to display one or more searchable entries from the database that correlate to the received keypad inputs, and wherein the programmed application is further configured to initiate a display of an input key number to associate a searchable entry in the database to an input key on the alphanumeric keypad that represents the keypad of the television remote control device.

13. A search system as recited in claim 8, wherein:
the user interface is further configured to display one or more searchable entries from the database that correlate to the received keypad inputs;
the programmed application is further configured to initiate a display of an input key number to associate a searchable entry in the database with an input key on the alphanumeric keypad that represents the keypad of the television remote control device; and
the television-based device is further configured to receive a keypad input entered on the keypad of the television remote control device to select the searchable entry associated with the input key number.

14. A method, comprising:
receiving keypad inputs entered on a keypad of an input device;
displaying a keypad representation of the keypad of the input device, the keypad representation having input keys that include a display of characters;
displaying one or more searchable entries from a database that correlate to the received keypad inputs; and
displaying an input key number to associate a searchable entry from the database with an input key on the keypad representation, wherein changing the display includes changing the characters on the at least one input key to display a searchable entry from the database that correlates to the received keypad inputs.

15. A method as recited in claim 14, further comprising correlating the received keypad inputs to the one or more searchable entries in the database.

16. A method as recited in claim 14, further comprising changing the display of the characters on the at least one input key to display subsequent possible character selections based on the received keypad inputs.

17. A method as recited in claim 14, further comprising changing the display of the characters on at least one input key after each keypad input is received.

18. A search system, comprising:
a television-based device configured to receive keypad inputs of a search term entered on a keypad of a television remote control device;
a user interface configured to display the keypad inputs as they are received, and further configured to display an alphanumeric keypad that represents the keypad of the television remote control device, the alphanumeric keypad having input keys, at least one input key including a display of characters; and
a programmed application configured to correlate a keypad input of the search term to one or more searchable entries in a database, the programmed application further configured to change the display of the characters on the at least one input key after each keypad input is received, wherein the programmed application is further configured to initiate a change of the display of the characters on the at least one input key to display to display a searchable entry based on the received keypad inputs.

19. A method, comprising:
receiving keypad inputs of a search term on a keypad of an input device;
displaying a keypad representation of the keypad of the input device, the keypad representation having input keys, at least one input key including a display of characters;
correlating a keypad input of the search term to one or more searchable entries in a database;
displaying the one or more searchable entries from the database that correlate to the received keypad inputs; and
changing the display of the characters on the input keys of the keypad representation, wherein the display on the at least one input key is changed to display subsequent possible character selections based on the received keypad inputs, and wherein the display on at least a second input key is changed to display a portion of a searchable entry from the database that correlates to the received keypad inputs.

20. A search system, comprising:
a television-based device configured to receive keypad inputs of a search term entered on a keypad of a television remote control device;
a user interface configured to display the keypad inputs as they are received, and further configured to display an alphanumeric keypad that represents the keypad of the television remote control device, the alphanumeric keypad having input keys, at least one input key including a display of characters; and
a programmed application configured to correlate a keypad input of the search term to one or more searchable entries in a database, the programmed application further configured to change the display of the characters on the at least one input key after each keypad input is received, wherein the display on the at least one input key is changed to display subsequent possible character selections based on the received keypad inputs, and wherein the display on at least a second input key is changed to display a portion of a searchable entry from the database that correlates to the received keypad inputs.

* * * * *